(12) United States Patent
Münstermann et al.

(10) Patent No.: US 10,807,204 B2
(45) Date of Patent: Oct. 20, 2020

(54) REMOVABLE MAGAZINE AS WELL AS SYSTEM AND METHOD FOR LOADING A REMOVABLE MAGAZINE AND A SETTING DEVICE

(71) Applicant: BÖLLHOFF VERBINDUNGSTECHNIK GMBH, Bielefeld (DE)

(72) Inventors: Jörg Münstermann, Gütersloh (DE); Jan-Robert Ziebart, Werther (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 161 days.

(21) Appl. No.: 15/262,062

(22) Filed: Sep. 12, 2016

(65) Prior Publication Data

US 2017/0072521 A1    Mar. 16, 2017

(30) Foreign Application Priority Data

Sep. 14, 2015    (DE) .................. 10 2015 115 483

(51) Int. Cl.
| | | |
|---|---|---|
| *B23P 9/04* | (2006.01) | |
| *B21J 15/32* | (2006.01) | |
| *B65G 29/00* | (2006.01) | |
| *B23P 19/04* | (2006.01) | |

(52) U.S. Cl.
CPC ............... *B23P 19/04* (2013.01); *B21J 15/32* (2013.01); *B65G 29/00* (2013.01)

(58) Field of Classification Search
CPC ........... B23P 19/04; B65G 29/00; B21J 15/32
See application file for complete search history.

(56) References Cited

U.S. PATENT DOCUMENTS

| | | |
|---|---|---|
| 2,216,403 A | 10/1940 | Oeckl et al. |
| 2012/0017728 A1 | 1/2012 | Schmidt |

FOREIGN PATENT DOCUMENTS

| | | |
|---|---|---|
| CN | 202316891 U | 7/2012 |
| CN | 203791561 U | 8/2014 |
| DE | 102005015032 A1 | 10/2006 |
| DE | 102006036981 A1 | 2/2008 |
| DE | 102009035867 A1 | 9/2010 |
| DE | 102009040764 A1 | 3/2011 |
| DE | 102014011608 A1 | 3/2015 |
| EP | 1916044 A1 | 4/2008 |
| WO | WO0007751 A1 | 2/2000 |
| WO | WO2007031701 A1 | 3/2007 |

OTHER PUBLICATIONS

CN Office Action for CN Application No. 201610827105.3 dated May 4, 2018 (7 pages).
EP Extended Search Report for EP Application No. 16182856.1 dated Feb. 3, 2017 (10 pages).

*Primary Examiner* — John C Hong
(74) *Attorney, Agent, or Firm* — Reising Ethington P.C.; Matthew J. Schmidt

(57) ABSTRACT

A removable magazine may include a plurality of connection elements. The connection elements are arranged in a plurality of chambers from which they can be unloaded individually and specifically. Further, a setting device is disclosed that may operate in combination with this removable magazine.

19 Claims, 9 Drawing Sheets

Figure 1:
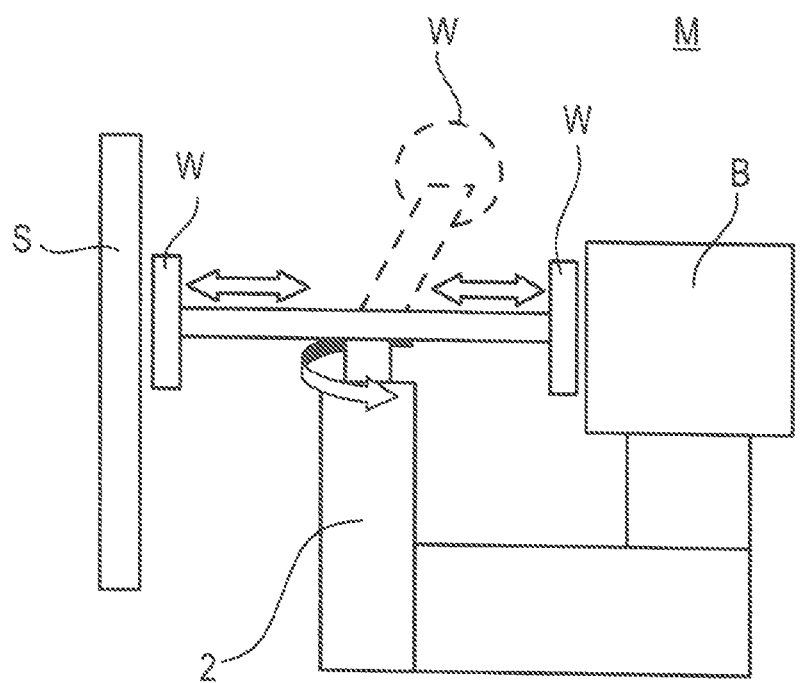

REMOVABLE MAGAZINE AS WELL AS SYSTEM AND METHOD FOR LOADING A REMOVABLE MAGAZINE AND A SETTING DEVICE

CROSS REFERENCE TO RELATED APPLICATIONS

This application claims priority to German Patent Application No.: DE 10 2015 115 483.8 filed Sep. 14, 2015. The content of this priority application is incorporated herein by reference in its entirety.

TECHNICAL FIELD

The present disclosure is related to a removable magazine in which a plurality of connection elements is storable at a plurality of defined positions. This removable magazine may be used in combination with joining tools, as for example a setting device for connection elements like punch rivets, welding bolts, bolts, nails, welding nuts, screws and the like. Further, the present disclosure is related to a supply system with the above components, a method for loading a setting device by means of this removable magazine as well as a method for operating a setting device which has been provided with the above removable magazine.

BACKGROUND

In the prior art, different magazine constructions for storing a plurality of joining elements are known. These are used for example in combination with nail devices used on building sites or the like. An example for such a magazine is shown in U.S. Pat. No. 2,216,403. Here, the nails are arranged in a circular magazine in radially extending grooves. In a central point of the magazine, these grooves merge into a transfer rail so that nails are supplied to the tool by means of this way. This construction has, besides its large space requirement, the disadvantage that no selective removal of individual connection elements is possible. Instead, the point at this arrangement is to store as many connection elements as possible within the magazine to be able to process them afterwards without interruption.

DE 10 2005 015 032 A1 describes a magazine in combination with a setting device in which the joining elements have already been separated and have been stored suitably arranged for processing in the setting device. To this end, a disk having a plurality of circumferentially arranged chambers is provided. Always one auxiliary joining part is arranged in each chamber in a position-orientated manner For providing it to the setting device, this joining element is always individually shot to the setting device for processing. This occurs for example by means of using compressed air and a suitable profile hose which is adapted in its inner contour to the dimensions of the rivet to be joined. The magazine disk used here in combination with the setting device is loaded with joining elements by means of a supply channel and is unloaded by means of an unloading channel arranged oppositely to the supply channel. Further, the processing of the joining elements stored in this magazine subsequently occurs chamber for chamber. For facilitating the processing of the joining elements in the setting device, the joining elements are arranged within the chamber with their longitudinal axis orientated parallel to the rotational axis of the magazine.

WO 2007/031701 A1 describes a loading station in which a magazine for a setting device is provided with a respective amount of joining elements. After the magazine has been filled, the setting device takes over, for example by means of a robot, the filled magazine to process the joining elements stored therein subsequently. The joining elements provided in the magazine are arranged in one row one after the other in chambers provided therefor. Accordingly, the processing of these joining elements occurs one after the other as only one axial outlet opening for the joining elements is provided for the storage rail used here.

WO 00/07751 describes the preparation of different groups and types of connection elements for making a processing of these connection elements more effective. The pre-packaging of connection elements takes place in so-called rivet packages in which the preferred groupings and type combination of the connection elements are welded for example into respective plastic containers. These packages of joining elements thus provide an alternative to the usage of magazines or removable magazines.

DE 10 2009 040 764 A1 describes a removable magazine for feeding a setting device. This removable magazine has a rotary arranged tooth belt in the inter-tooth spaces of which always one joining element can be arranged. These joining elements are supplied to the tooth-belt by means of a supply opening. After the full removable magazine has been combined with a setting device, the punch rivets to be processed are supplied to a processing through the supply opening. Also this arrangement of the removable magazine has the disadvantage that the individual chambers of the rotary tooth belt must be processed one after the other which limits the flexibility of the setting device and of the joining elements stored in the removable magazine.

It is therefore an object of at least some implementations of the present invention to propose a removable magazine for the combination with a joining tool by means of which joining processes may be organized more effectively.

SUMMARY

The above object is solved by a removable magazine according to the independent patent claim 1, by a setting device with this removable magazine according to the independent patent claim 9, by a supply system for supplying a setting tool with joining elements according to the independent patent claim 10, by a method for loading a setting device by means of the removable magazine according to the independent patent claim 11 as well as by a method for operating a setting device with this removable magazine according to the independent patent claim 15. Advantageous embodiments and developments result from the following description, the accompanying drawings and the appending patent claims.

A removable magazine has a plurality of connection elements dischargeably storable at a plurality of defined positions, and the removable magazine may be connectable with a loading station and a setting device for transfer and removal of connection elements. In at least some implementations, the removable magazine has the following features: a storage plate having a plurality of regularly arranged and only one-sided open chambers, the shape of which is adapted to a connection element to be received, especially to a type of a connection element to be received, so that at least one connection element is position-orientated storable therein, a closing component closing the plurality of regularly arranged chambers such that at least for an unloading of the plurality of defined arranged chambers, preferably for the unloading in the direction of a setting device for the purpose of supplying a connection element to the joining channel of the setting device, only one chamber is opened, wherein the storage plate and the closing component are rotatable and/or pivotable and/or movable with respect to each other so that the respective chamber is movable with respect to the chamber opening such that at least a chamber-specific unloading of the respective chamber takes place via the chamber opening.

The inventive removable magazine is part of a supply system for supplying a joining tool, as for example a setting device for punch rivets, with a specific amount and a purposeful selection of defined joining elements. For this purpose, the joining elements are preferably arranged in defined and identifiable chambers from which they can be individually removed again for processing. This arrangement of the individualized chambers for storing the joining elements makes it possible that besides a pre-selected number of joining elements also different types or kinds of joining elements are storable within only one removable magazine. If thus the removable magazine as part of the supply system is loaded with different numbers and different types of joining elements, the supply of the setting device with joining elements from the only one removable magazine is guaranteed despite different joining tasks. From this it follows that the configuration of the removable magazine and the respective individual filling or loading of the chamber of the removable magazine makes unnecessary often required magazine changes for different types of joining elements.

The preferred storage plate of the removable magazine comprises the plurality of defined arranged and only one-sided open chambers for storing always at least one joining element. The defined arrangement serves to make the single chambers identifiable and thus specifically loadable and/or unloadable. For this purpose, it is for example preferred to individualize the individual chambers by means of a coordinate system on the storage plate so that, for example, the information with respect to the position and with respect to the type and/or amount of the loading of the individual chambers can be stored individually on an industry computer or on a similar storage device. It is thus preferred to identify the chambers being present in the storage plate by polar coordinates. For this purpose, the storage plate is rotatable in a specific angle by means of a stepping motor while a linear displacement of the chamber opening in radial direction takes place. In the same way, also other known coordinate systems may define the chamber position.

Further, it is preferred to adapt the chambers in their design and dimension to the joining elements to be received. This results in the possibility that the joining elements can be held in the individual chambers position-orientated. Joining elements in this context are preferably punch rivets, bolts, welding bolts, and welding nuts, nails, welding screws as well as other joining elements to be processed with setting devices. These joining elements are preferably supplied from supply containers. The supply containers contain always only joining elements of one defined type, the dimensions and properties of which are known.

For being able to specifically load and unload the individual chambers, a movable chamber opening is provided. This chamber opening moves with respect to the plurality of chambers so that each chamber is specifically approachable, fillable or a joining element stored therein is removable. The relative movement between chamber opening and the plurality of chambers is preferably realized in different ways and manners. According to one possibility, all chambers are closed by a closure-like component. This closure-like component contains the above-mentioned chamber opening. Below this closure-like component and thus also below the chamber opening, the storage plate is movable by rotating and/or linearly moving such that the individual chambers may be moved specifically to the chamber opening. In the same way it is possible that the storage plate having the plurality of chambers is fixed and only the closure component with chamber opening is arranged movably. According to a further alternative, it is preferred that the closure component as well as the storage plate having the plurality of chambers are moved to align the chamber opening and the individual chambers with respect to each other.

According to at least one embodiment, the storage plate is a rotatable disk having a thickness parallel to a rotational axis and the chambers are arranged with a longitudinal axis parallel or perpendicular to the rotational axis within the storage plate.

According to a further embodiment, the chambers are arranged in one or a plurality of concentric circles regularly around the rotational axis of the storage plate. It is also preferred to make radial or spiral-like arrangements of the chambers as long as the individual positions of the chambers are identifiable or definable. This identification preferably takes place by means of a coordinate system having Cartesian or polar coordinates in which the chamber opening and/or the chambers are moved, as it has been described above. According to a further preferred embodiment, the chambers are arranged matrix-like.

For being able to store the joining elements to be transferred to the setting device, the complete storage plate is available for arranging the individual chambers. Thus, it is preferred to distribute the chambers in a uniformly or regularly arrangement with equal distances with respect to each other over the complete storage plate. This arrangement can consist of concentric circles of chambers arranged next to each other around the rotational axis. In the same way, it is also conceivable to arrange the chambers along straight lines next to each other so that they are arranged distributed on the storage plate like a chess-board pattern or a radial pattern.

For adjusting the supply and the removal of the joining elements stored in the chambers to the loading station and/or the setting device, the chambers are preferably arranged with their longitudinal axis parallel or perpendicular to the rotational axis of the disk. Accordingly, an arrangement for the joining elements with respect to their longitudinal axis parallel or perpendicular to the rotational axis of the disk results. According to a further embodiment, the chambers are accessible from an outer side. Preferably, a longitudinal axis of the chamber is arranged parallel or inclined or perpendicular to the rotational axis of the storage plate so that a connection element can be removed in a direction parallel or angularly to the rotational axis of the storage plate at least from one defined arranged chamber, and can preferably also be supplied to one defined arranged chamber. According to a further embodiment, a loaded connection element is removable from a chamber or can be supplied to a chamber in a direction parallel to the rotational axis of the storage plate supported by compressed air. According to this preferred arrangement, the joining elements are arranged with their longitudinal axis parallel to the radius of a for example round or rotation-symmetric or polygonal storage plate. The loading of the chambers as well as the removal of the joining elements from the individual chambers does, however, not take place in radial direction but through the chamber opening in axial direction with respect to the rotational axis of the storage plate or in an angle with respect to the rotational axis of the storage plate.

This loading and unloading is supported according to an embodiment by compressed air. This means that for example the joining elements to be supplied to a chamber are moved through a profile hose by means of compressed air until they reach the chamber. At this, the at least one joining element is supplied in loading direction to the chamber. Preferably, compressed air channels are provided at the storage plate having an opening into the individual chambers. As soon as an overpressure is connected to these compressed air conduits, air is blown against the loading direction into individual chambers or selected chambers or into all chambers. These air nozzles support thus a moving of the joining elements stored in the individual chambers in an unloading direction. In the same way, it is preferred to put the joining elements in the chambers under spring pretension to support an unloading.

It is further preferred to form the storage plate angularly and to arrange the chambers regularly distributed along straight lines running parallel and/or perpendicular to each other. The chamber opening is then preferably positionable individually above selected chambers by means of one or a plurality of linear actuators. It is also conceivable to realize this positioning of the chamber opening by means of a rotation and/or a linear movement in combination with a rotation or solely by means of a linear movement of the closure component. For realizing these movements, usual engines, rotating stepping motors, linear drives and/or piezo drives are preferred. According to a preferred embodiment, the storage plate with the defined arranged chambers is movable relative to the at least one chamber opening by means of a stepping motor and/or a linear drive.

According to a further embodiment, the storage plate has at least one elongated hole-like chamber, in each of which one or several connection elements are arrangeable, wherein at least one connection element is arranged within the elongated hole-like chamber with its longitudinal axis perpendicular or parallel or inclined with respect to the rotational axis of the storage plate.

Further, a setting device may be providable and operable with the above-described removable magazine.

Further, the already above-mentioned supply system for the supply of a setting tool with a plurality of joining elements by means of the above-mentioned removable magazine may be provided. The supply system comprises the following features: an automatic loading station with at least one docking position or site for the removable magazine to load the removable magazine with joining elements from one or multiple supply containers in each of which a plurality of similar connection elements is available disordered or oriented so that the connection elements are suppliable to the removable magazine to individual chambers or to groups of chambers one after the other individually or as a plurality, a rotatable and/or pivotable and/or displaceable arranged manipulator at which at least one removable magazine is fastenable and from which the removable magazine is releasable for docking the removable magazine to be loaded to the loading station, for undocking the loaded removable magazine from the loading station, preferably for holding at least one loaded removable magazine and/or removable magazine to be loaded for docking the loaded removable magazine to the setting device and for undocking the discharged or unloaded removable magazine from the setting device. The removable magazine comprises a storage plate having a plurality of defined arranged chambers and a closure component, wherein the closure component closes the plurality of defined arranged chambers such that at least for an unloading of the plurality of defined arranged chambers only one chamber is opened by arranging the storage plate and the closure component rotatably and/or pivotable and/or displaceable, wherein the removable magazine is rotatable, disk-like and/or displaceable and comprises a plurality of chambers so that at least the unloading of the chambers at the setting tool is realizable via a single opening being present for the connection element stored in the chamber being in the loading or unloading position, respectively.

A method is also disclosed for loading a setting device by means of a removable magazine, especially a removable magazine according to the above-described embodiments. This method comprises the following steps: filling a plurality of chambers of the removable magazine individually and/or in groups, respectively, with a connection element at a loading station, sensing a retrievable information which chamber of the removable magazine contains a connection element of which type, releasing the removable magazine from the loading station, connecting the removable magazine with a setting device and transmitting the retrievable information to the setting device so that for the preparation of a joining process a specific joining element is specifically unloadable from a defined chamber and is suppliable to the setting device, preferably how many and/or which and/or in which chambers of the removable magazine connection elements are stored.

As has already been described above in combination with the supply system, first of all a removable magazine is transferred to a loading station and filled there. The transferring of the removable magazine to the loading station takes place preferably by means of a manipulator which takes over an empty removable magazine from a setting device and transfers it by means of a linear, a pivoting and/or a combined linear and pivoting movement to the loading station. It is preferred to transmit also the required information with each removable magazine which chambers are loaded or unloaded and preferably which types and how many connection elements are arranged in the individual chambers. Provided with this information, the loading station is able to newly load specifically the chambers with connection elements in which no connection elements are contained anymore.

It is also preferred to provide the manipulator with an automatically prefilled removable magazine. According to a further preferred embodiment, the removable magazine is filled by means of an intermediate storage. This intermediate storage loads preferably all chambers, or 50 to 80% of the chambers in only one step. After the removable magazine has been loaded in the loading station with connection elements, the removable magazine is transferred to the setting device again by means of the manipulator. At the same time of the transferring of the removable magazine, preferably also the information is transmitted to the setting device in which chamber which connection elements are arranged. This information transmittal takes place preferably by means of a transponder which is arranged on the removable magazine and contains the required information. It is also preferred to store this information in an industrial computer from which the setting device may recall this information again based on a data connection. According to a further preferred embodiment, the information with respect to the content of the chambers of the removable magazine transferred to the setting device is transmitted optically, for example by means of a barcode or number code, mechanically, for example by means of an embossed code, or in any other conceivable manner.

According to a further preferred embodiment of the present method, an electronic sensing occurs during the loading of the removable magazine which connection element is stored in which chamber of the removable magazine. This information is stored recallable in a transponder or computer. Further, it is preferred that the removable magazine is transferred by means of the manipulator automatically from the loading station to the setting device and from the setting device to the loading station. It is also preferred to transfer the removable magazine between loading station and setting device manually.

A method is disclosed for operating a setting device with a removable magazine, especially a loaded removable magazine according to one of the above-described embodiments. The method comprises the following steps: selecting a connection element which is suitable for a joining task from a plurality of connection elements which are stored in a removable magazine, unloading the selected connection element from a defined arranged chamber of the removable magazine into the setting device based on a recallable information for the selected connection element and establishing a joining connection with the selected connection element. According to a further preferred embodiment of the inventive method, the joining element is selected from a plurality of different joining elements and removed from their respective chamber of the removable magazine. Thereafter, the supply of this specific joining element to the setting device takes place to establish the connection.

BRIEF DESCRIPTION OF THE ACCOMPANYING DRAWINGS

Figure 2:
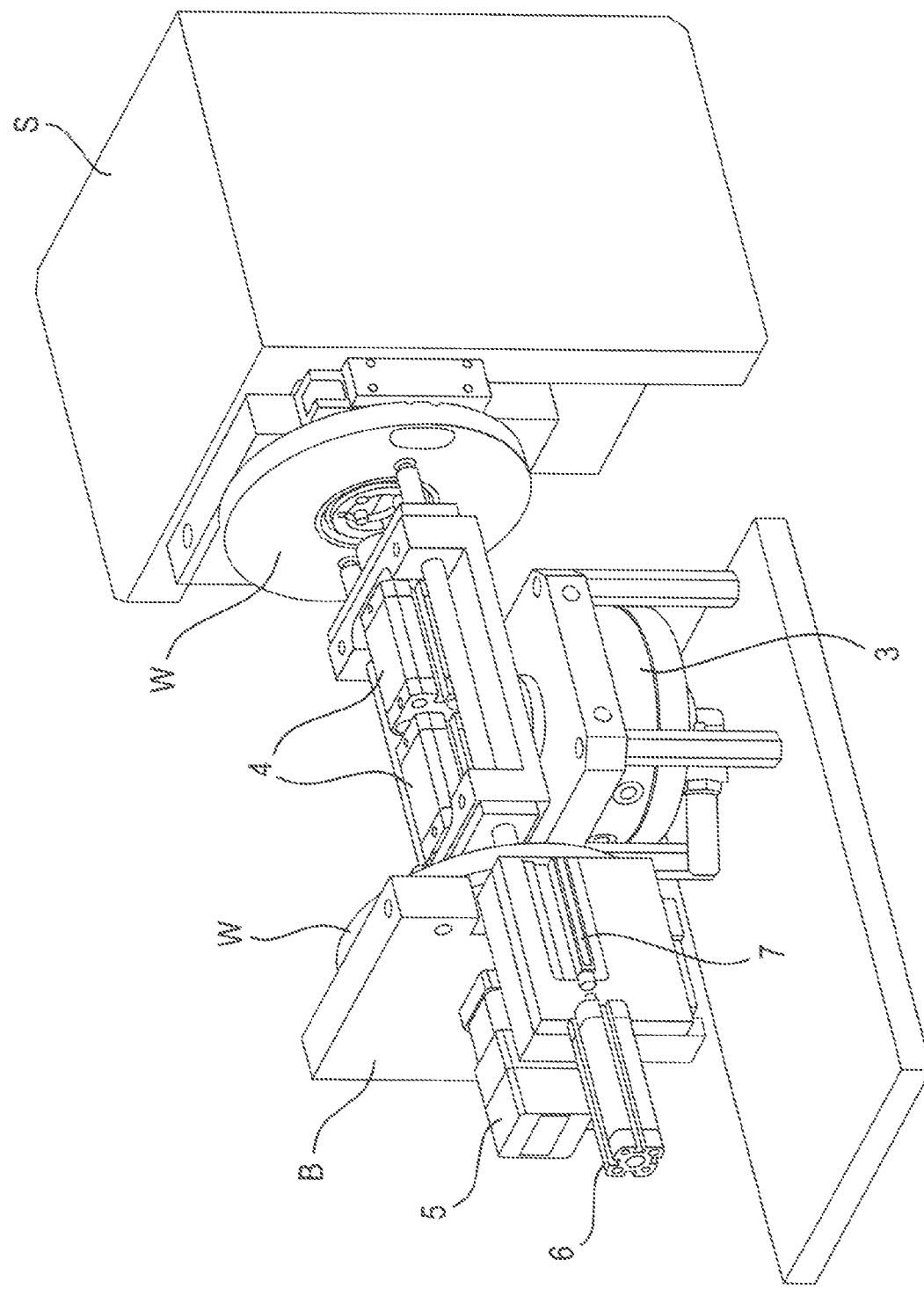
Figure 3:
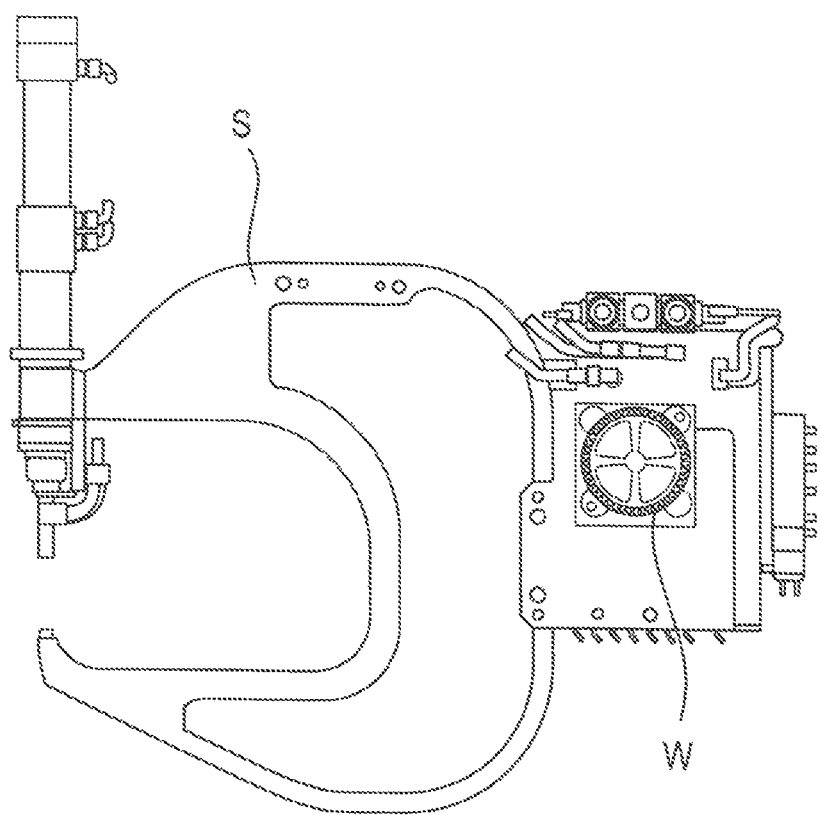
Figure 4:
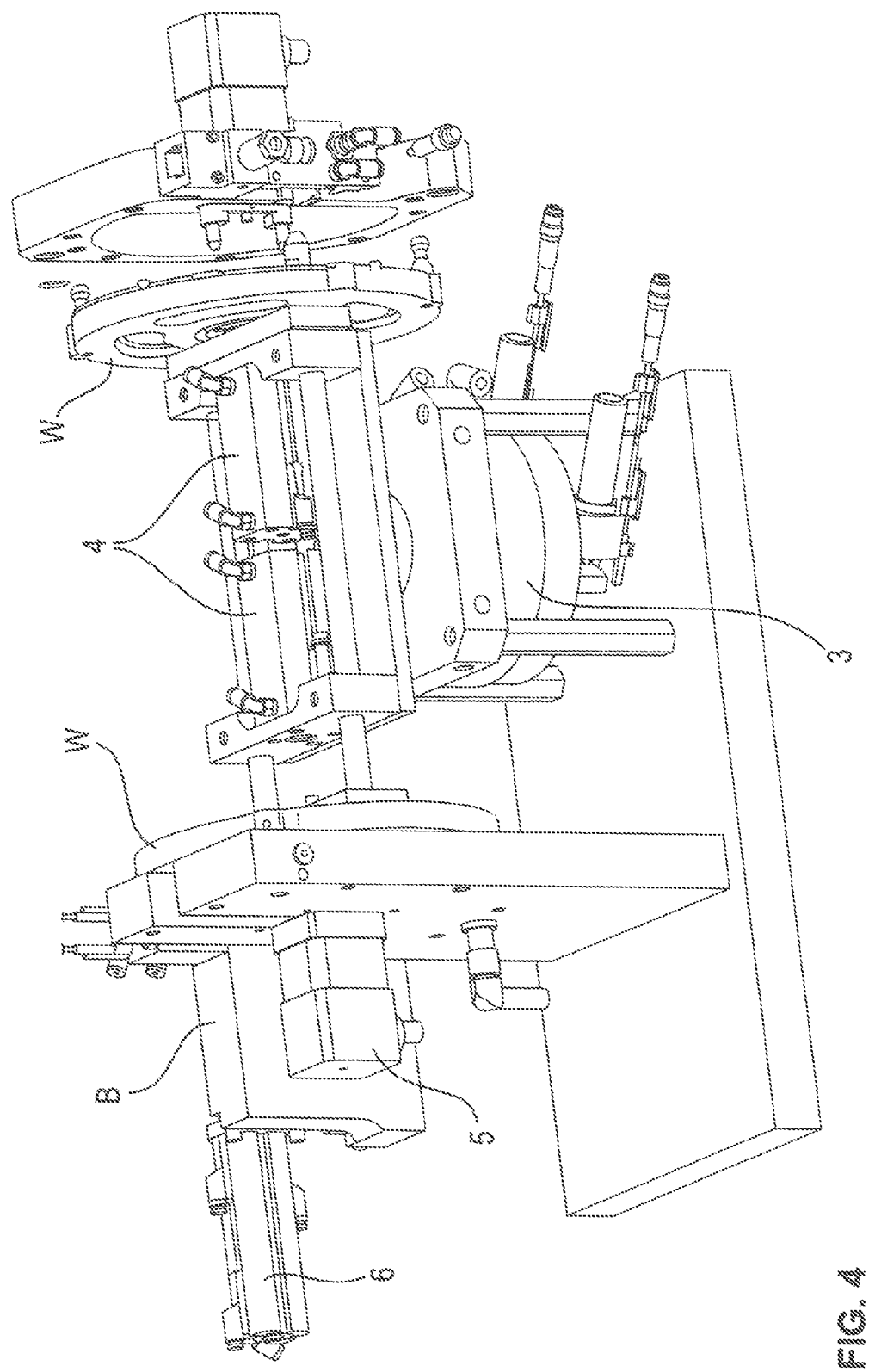
Figure 5:
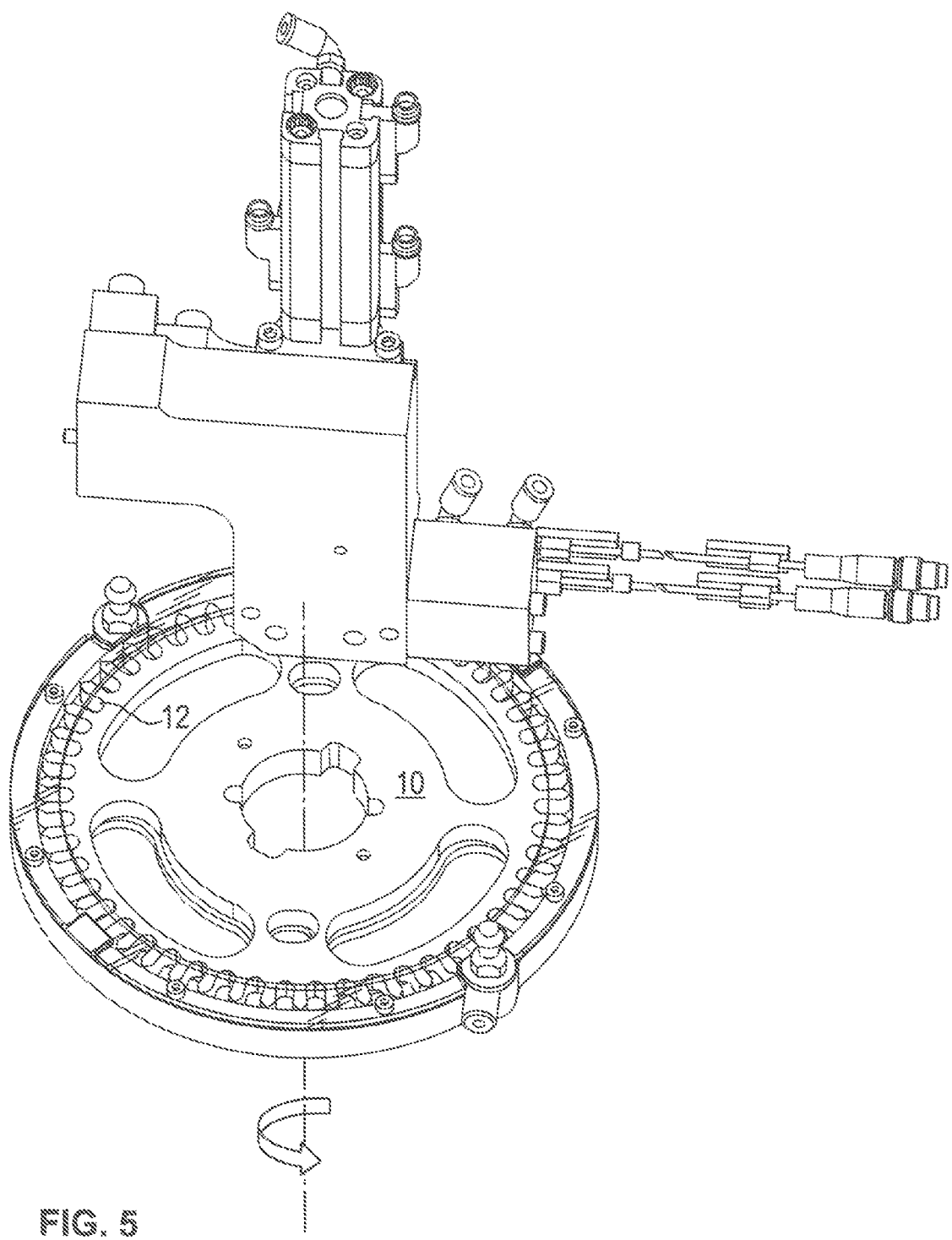
Figure 6:
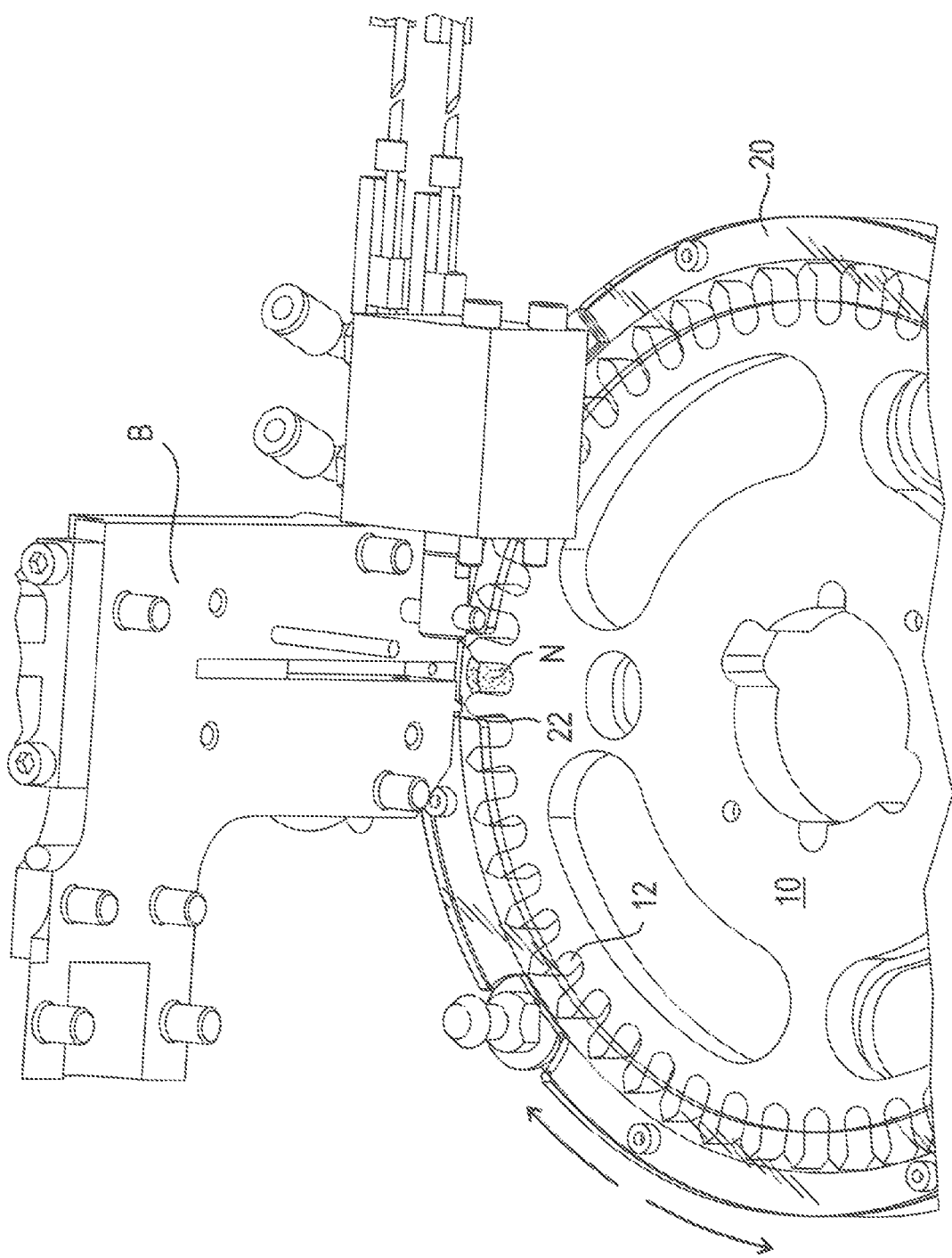
Figure 7:
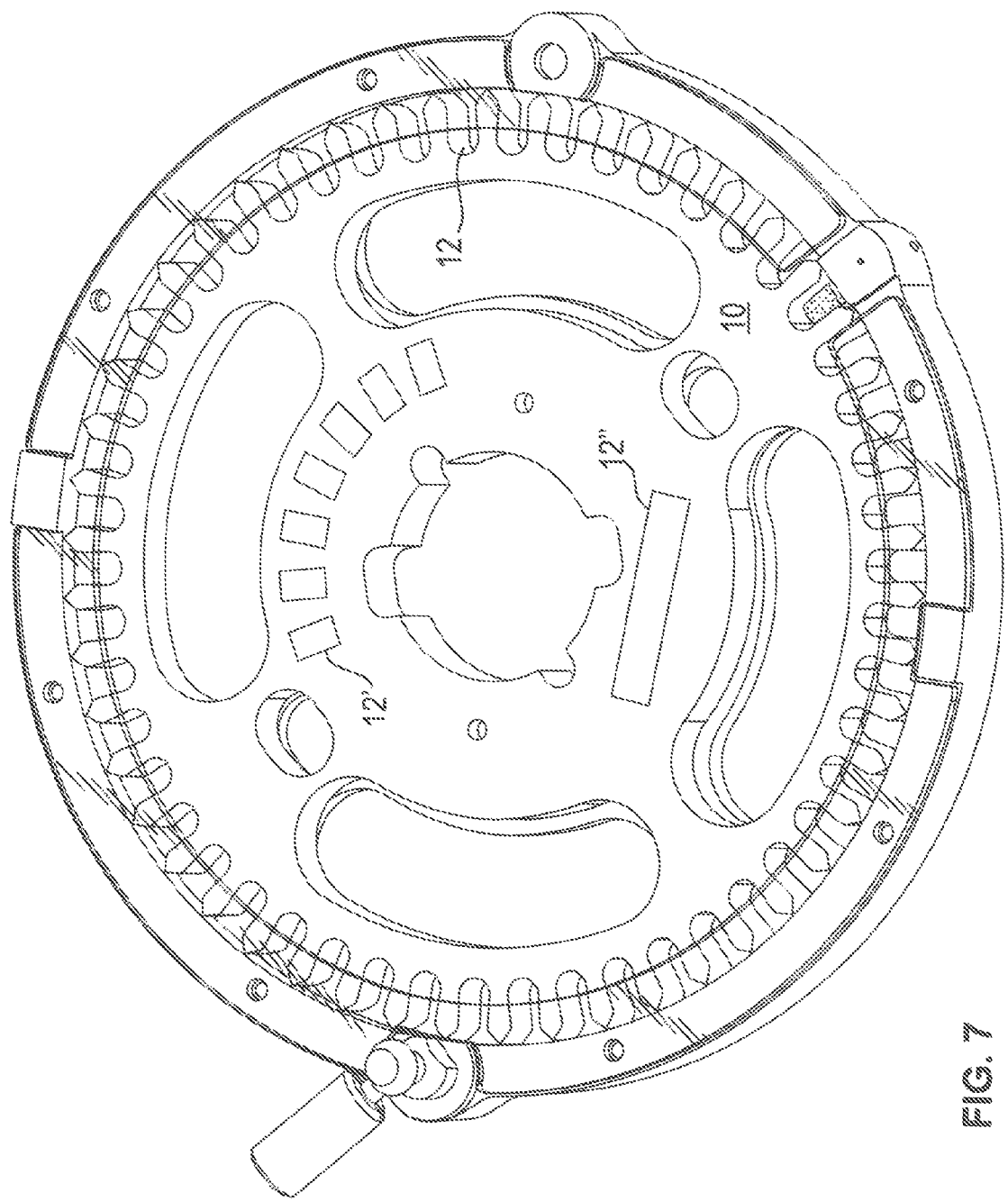
Figure 8:
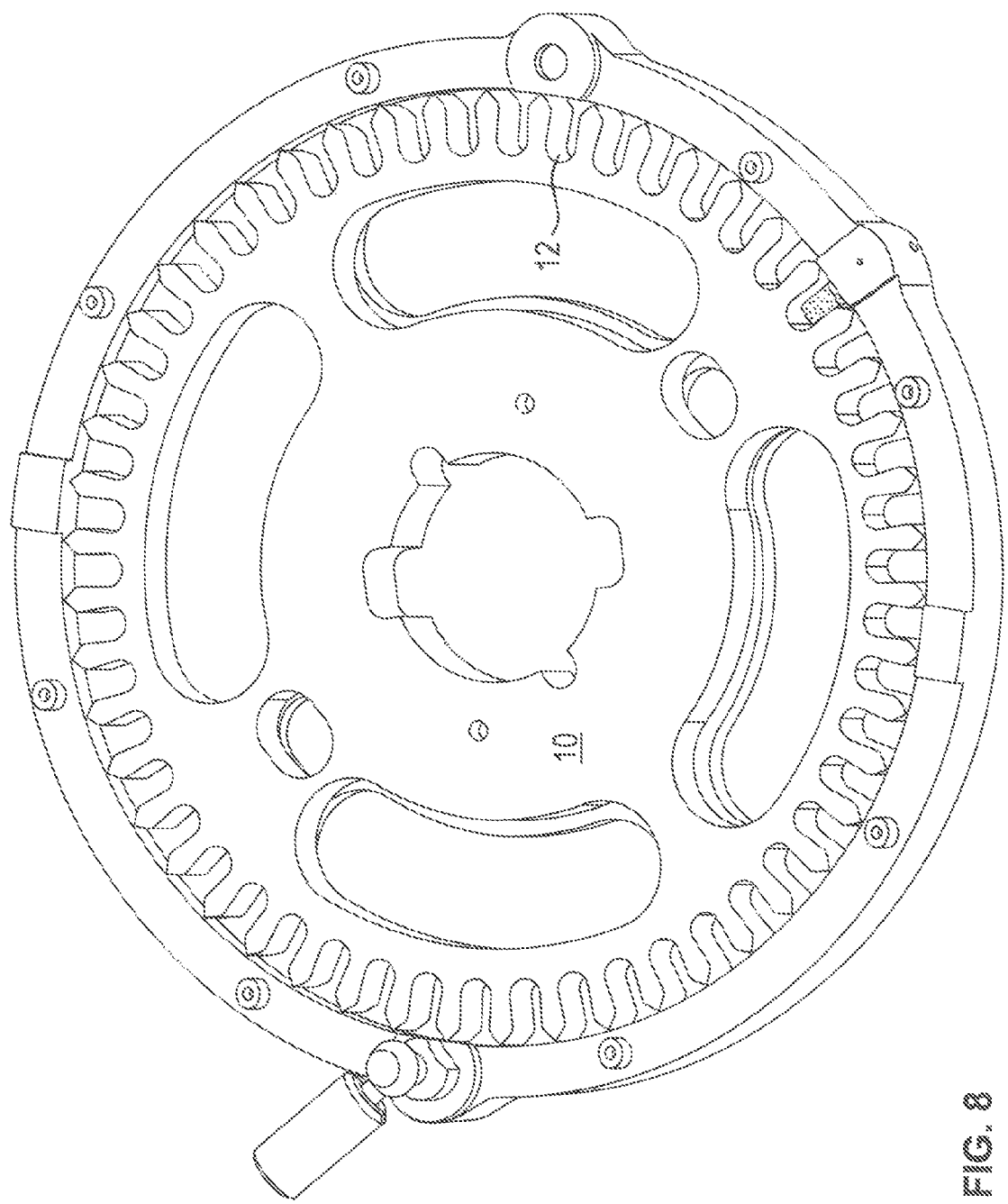
Figure 9:
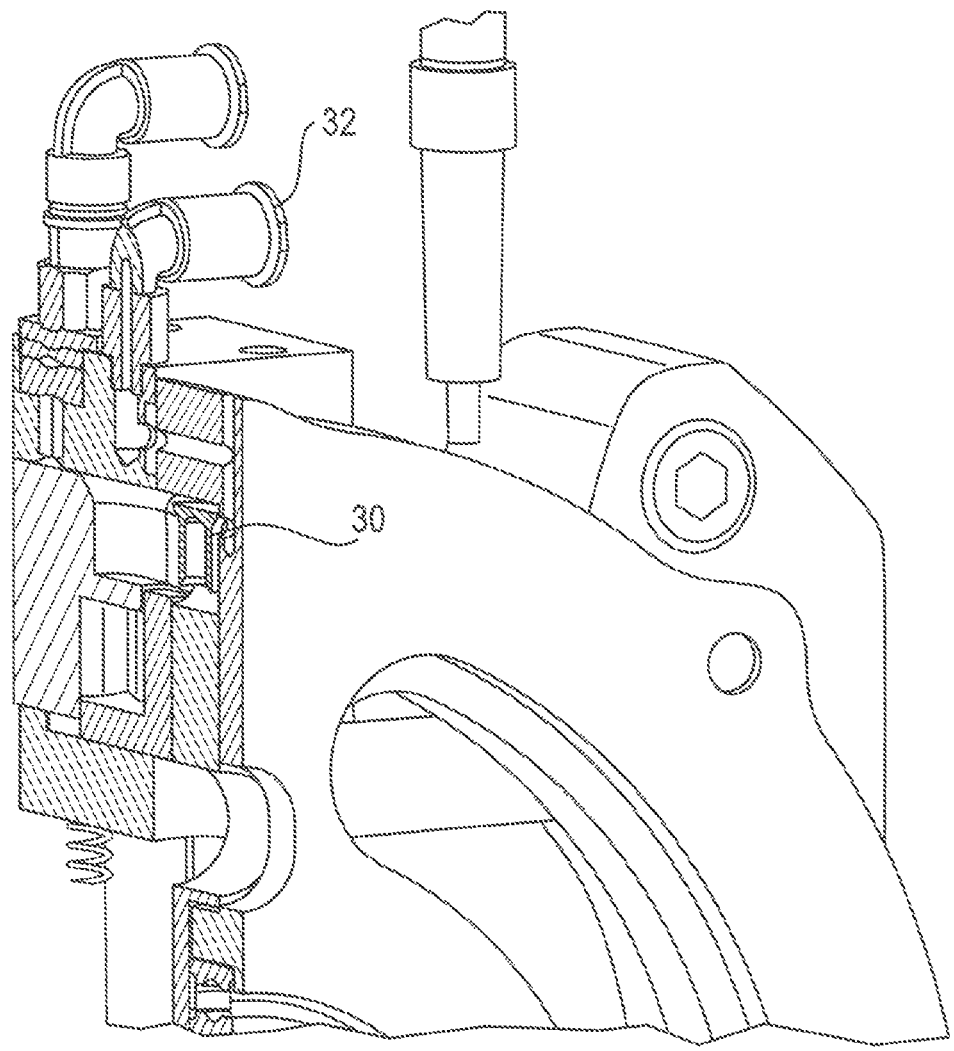

Certain embodiments of the present invention are explained in detail with respect to the accompanying drawings. It shows:

FIG. 1 a schematic side view of a preferred embodiment of the manipulator in combination with a loading station and a setting device, FIG. 2 a preferred embodiment of the manipulator with loading station and setting device, FIG. 3 a preferred setting device with a removable magazine installed therein, FIG. 4 an enlarged depiction of a preferred embodiment of the preferred manipulator, FIG. 5 a schematically depiction of a preferred loading station in combination with parts of the preferred removable magazine, FIG. 6 an enlarged depiction of the loading station of the removable magazine according to FIG. 5, FIG. 7 an enlarged schematic depiction of parts of the removable magazine, FIG. 8 a schematic depiction of parts of the removable magazine, and FIG. 9 a detail enlargement of the preferred removable magazine for illustrating the air supply to the chambers of the removable magazine.

DETAILED DESCRIPTION

FIG. 1 shows the schematic depiction of a manipulator M. It has a movement arrangement 2 by means of which at least a first removable magazine W is movable. Preferably, two, three (see dashed depiction) or four (not shown) removable magazines W are fastened releasably at the movement arrangement 2. The movement arrangement 2 takes over a loaded removable magazine W at a loading station B where the removable magazine W has been loaded with joining elements N. It is also preferred to fasten a pre-filled removable magazine W at the manipulator M. Preferably, one or several removable magazines W are held at the manipulator M intermittently, for stopover or generally temporarily until they are requested by the setting device S.

From there, the movement arrangement 2 moves the removable magazine W by combinations of a linear and a pivoting movement from the loading station B to a setting device S. Following the pivoting movement of the movement arrangement 2, which is indicated by the arrow, the removable magazine W is docked to the setting device S by means of a linear movement to the setting device S. This transmittal of the partly or completely unloaded removable magazine W to the loading station B takes place in reverse direction, respectively.

A preferred embodiment of the manipulator M is shown in FIG. 2 in a perspective side view. The movement arrangement 2 has a central pivoting drive 3 and two linear drives 4 acting in opposite directions. The linear drives 4 serve for docking and undocking the removable magazine W to/from the loading station B and to/from the setting device S by removing the removable magazine W from the setting device S or the loading station B or by coupling it thereto. The pivoting drive 3 exchanges the removable magazines W against each other by means of a pivoting movement.

The loading station B comprises preferably a rotational drive 5 by means of which the removable magazine W (see below) is rotated for loading. During this, the joining elements N, for example punch rivets, are supplied to a chamber 12 of the removable magazine W to be loaded via an element infeed 6 and a preferred breaking distance 7 by means of pressurized air. The loading of the removable magazine W preferably takes place by means of one or a plurality of chamber openings (see below). To this end, several joining elements of different types are supplied at the same time to the plurality of chamber openings or loading openings by means of several supply conduits and/or by means of switches. The loading of several chambers preferably takes place at the same time. Therefor, the storage plate 10 is also rotated forward stepwise so that after one further rotation step again an empty chamber for the simultaneous and/or individual loading is available. As soon as the removable magazine W has been transferred to the setting device S, the manipulator M is released from the removable magazine W to be able to receive at this position a new removable magazine W for filling.

FIG. 3 shows the setting device S with a docked removable magazine W in a schematic side view. Preferably, the removable magazine is arranged at the console or bracket at the C-frame of the setting device S.

An enlarged depiction of the manipulator M of FIG. 2 is shown in FIG. 4. By an elongation of the linear drive 4, the removable magazine W is docked to the loading station B. At the same time, the other removable magazine W has been decoupled from the setting device S (not shown) by shortening the linear drive 4 to be able to supply it to the loading station B.

FIGS. 5 to 8 show different views of the removable magazine W which is connected to the loading station B in the FIGS. 5, 6 and 9. According to a preferred embodiment, the removable magazine W comprises a storage plate 10 having a plurality of regularly or defined arranged chambers 12. Defined means in this context that the individual chambers are fixed in their position, are retrievable and are specifically selectable by a specification or certain movement of the components of the removable magazine, like storage plate, closure component and chamber opening.

According to the embodiment shown, the storage plate 10 is round and has circumferentially arranged chambers 12. As the storage plate 10 moves in a cage-like arrangement 20, the chambers 12 are nearly completely closed. To this end, the cage-like arrangement 20 almost completely encloses the storage plate 10 in the radial edge area. The cage-like arrangement 20 covers the chambers 12 with a collar-like section further so far that loaded joining elements cannot drop out.

It is also preferred to arrange the chambers 12 in concentric circles around the central point of the storage plate 10 as it is shown at the reference sign 12'. The rotational axis of the storage plate 10 also extends through the central point of the storage plate 10, around which it is rotated. For being able to unload the joining elements from the chambers 12' or to load them there, it is preferred to arrange the chamber opening 22 radially displaceable preferably by means of a linear slider or linear drive. According to a further preferred embodiment, several joining elements are arranged in an elongated hole 12". In all chambers 12, 12', 12", the joining elements are arranged preferably parallel or perpendicular or inclined with a longitudinal axis with respect to the rotational axis of the storage plate 10. It is also preferred to arrange several joining elements in the chambers 12, 12' or 12" adjacent to each other or behind each other. For supporting an unloading, the plurality of joining elements in a chamber 12, 12', 12" are supplied to an end of the chamber 12, 12', 12" at which the loading and/or unloading opening 22 opens into the chamber 12, 12', 12" by means of compressed air or spring force.

Independent from the shape of the chamber 12, 12', 12", the joining elements are unloaded and/or loaded preferably in axial direction with respect to the rotational axis of the storage plate 10.

Preferably, the storage plate 10 is rotated by means of a stepping motor so that the chambers 12 are individually movable to the loading station B. For illustration, a punch rivet N is arranged in the chamber 12 in front of the loading station B. It can be seen that the cage-like arrangement 20 is open above the chamber 12 with punch rivet or joining element N, respectively. Through this chamber opening 22, the supply of punch rivets N from the loading station B into the chamber 12 arranged below the chamber opening 22 is made possible. Thus, the cage-like arrangement 20 forms a closure component for the plurality of chambers 12. As the storage plate 10 can be moved with respect to the chamber opening 22 relatively, the chamber opening 22 can be arranged specifically above each chamber 12.

In case the chambers 12 are arranged in concentric circles around the central point of the storage plate 10, first of all the closure component 20 has to cover the upper side of the storage plate 10 also radially displaceable. The chamber opening 22 would preferably be a slider with opening (not shown) so that the chamber opening would be freely slidable radially inwardly and outwardly. Thus, also radially inner lying chambers could be loaded and unloaded.

According to a further preferred embodiment of the storage plate 10, it is formed angularly, preferably square shaped (not shown). The chambers 12 are arranged regularly distributed on the storage plate 10 like grid squares. The cage-like arrangement encloses preferably completely the angular storage plate 10. The chamber opening 22 is arranged in a radial slider so that each arbitrarily arranged chamber of the storage plate can be reached by a rotation of the storage plate in combination with a linear movement of the chamber opening or by two non-parallel linear movements of the slider in the plane of the storage plate.

At the chamber opening 22, the chamber 12 is only one-sided open. Especially, the joining element N is loaded and unloaded in axial direction with respect to the rotational axis of the storage plate 10. To this end, a stepping motor rotates the storage plate 10 and thus always the chamber 12 to be loaded below the chamber opening 22. As the movement of the stepping motor can be sensed, it is defined in which chamber which rivet N has been stored. For this purpose, the rivet N is measured in its length prior to the unloading or it is sensed in detail from which rivet type reservoir the here present rivet or the joining element N has been supplied to the chamber 12. Thus, the stored information with respect to the joining elements N loaded in the removable magazine W contains which joining element type is arranged with which joining element dimension in which chamber 12.

This information is then preferably storable in an RFID-tag which is arrangeable at the removable magazine W. As the removable magazine W is transferred together with the RFID-tag to the setting device S, the setting device S reads this information from the RFID-tag to then select specifically the desired rivet type for the connection to be produced. In the same way, this information for loading the removable magazine W can be stored in an industry computer and can be transmitted to the setting device S. It is further preferred to transmit this information via Bluetooth connection between loading station B and setting device S and/or between the removable magazine W and the setting device S.

As can be seen from the figures, the storage plate 10 is sufficiently thick to receive the joining elements N despite their shank and head diameter. According to a further preferred embodiment (not shown), the chambers are arranged with their longitudinal axis parallel to the rotational axis of the storage plate 10. Also at this arrangement, the loading and unloading takes place one-sided and at the side surface of the storage plate 10 as the chambers are only open one-sided.

Preferably, the joining elements N are fired via the element feed 6 to the chamber 12 below the chamber opening 22. For being able to discharging the joining elements N, preferably a compressed air connection 30 via the pressurized air conduit 32 is provided in each chamber 12. The compressed air connection 30 opens at the side facing away from the chamber opening 22 into the chamber 12 for blowing the joining element N out of the chamber 12. In this way, the supply of joining elements N to the joining channel is accelerated especially at the setting device S.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

LIST OF REFERENCE SIGNS

B loading station
S setting device
M manipulator
W removable magazine
2 movement arrangement
3 pivoting drive
4 linear drive 5 rotational drive
6 element infeed
7 breaking distance
10 storage plate
12 chamber
20 cage-like arrangement
22 chamber opening
30 compressed air connection
32 compressed air conduit

The invention claimed is:

1. A removable magazine in which a plurality of connection elements is dischargeably storable at a plurality of defined positions, wherein the removable magazine is connectable with a loading station and a setting device for transfer and removal of connection elements, wherein the removable magazine comprises the following features:
   a. a storage plate having a plurality of defined arranged and only one-sided open chambers, the shape of which is adapted to receive a connection element so that at least one connection element is storable therein position-orientedly,
   b. a closure component closing the plurality of defined arranged chambers such that for a loading and an unloading of the plurality of defined arranged chambers, only one chamber is opened at a time, wherein the closure component has only one chamber opening, and the only one chamber opening is relatively movable with respect to the plurality of defined arranged chambers, and all chambers except the chamber aligned with the only one chamber opening are closed by the closure component, so that each chamber is specifically approachable, fillable or a joining element stored therein is removable,
   c. the storage plate and the closure component are rotatable and/or pivotable and/or movable with respect to each other so that
   d. the respective chamber is movable with respect to the chamber opening such that a chamber-specific loading and a chamber-specific unloading of the respective chamber takes place via the only one chamber opening.

2. Removable magazine according to claim 1, in which the storage plate is a rotatable disk having a thickness parallel to a rotational axis and the chambers are arranged with a longitudinal axis parallel or perpendicular to the rotational axis.

3. Removable magazine according to claim 2, in which the chambers are arranged defined in one or a plurality of concentric circles and/or spiral-like and/or radially around the rotational axis and/or matrix-like.

4. Removable magazine according to claim 3, the chambers of which are arranged accessible from an outer side of the storage plate, wherein a longitudinal axis of the chamber is arranged parallel or inclined or perpendicular to the rotational axis of the storage plate so that a connection element can be removed in a direction parallel or angularly to the rotational axis of the storage plate at least from one defined arranged chamber.

5. Removable magazine according to claim 4, in which the chambers are connectable to a source of compressed air individually or in groups altogether, respectively, so that air can be blown in an unloading direction into the chamber against a loading direction.

6. Removable magazine according to claim 1, in which the storage plate is formed angularly and the chambers are arranged regularly distributed along straight lines running parallel and/or perpendicular to each other and/or radially with respect to a reference point of the storage plate.

7. Removable magazine according to claim 6, in which the storage plate with the defined arranged chambers is movable relative to the at least one chamber opening by means of a stepping motor and/or a linear drive.

8. Removable magazine according to claim 7, in which the chambers are connectable to a source of compressed air individually or in groups altogether, respectively, so that air can be blown in an unloading direction into the chamber against a loading direction.

9. Removable magazine according to claim 1, in which the storage plate has at least one elongated hole chamber, in each of which one or several connection elements are arrangeable, wherein at least one connection element is arrangeable within the elongated hole chamber with its longitudinal axis perpendicular or parallel or angularly with respect to the rotational axis of the storage plate.

10. Removable magazine according to claim 9, in which the chambers are connectable to a source of compressed air individually or in groups altogether, respectively, so that air can be blown in an unloading direction into the chamber against a loading direction.

11. Removable magazine according to claim 1, in which the chambers are connectable to a source of compressed air individually or in groups or altogether, respectively, so that air can be blown in an unloading direction into the chamber against a loading direction.

12. A setting device comprising a removable magazine according to claim 1.

13. Supply system for the supply of a setting tool with a plurality of joining elements by means of a removable magazine according to claim 1, in which a plurality of connection elements is dischargeably storable at a plurality of defined positions, wherein the removable magazine is connectable with a loading station and a setting device for transfer and removal of connection elements, and wherein the supply system comprises the following features:
   an automatic loading station with at least one docking site for the removable magazine to load the removable magazine with joining elements from one or multiple supply containers, wherein in the supply containers, respectively, a plurality of similar connection elements is arranged or is available in an oriented manner so that the connection elements are suppliable to the removable magazine to individual chambers or to groups of chambers one after the other individually or as a plurality,
   a rotatable and/or pivotable and/or displaceable arranged manipulator at which at least one removable magazine is fastenable and from which the removable magazine is releasable for docking the removable magazine to be loaded to the loading station, for undocking the loaded removable magazine from the loading station, for docking the loaded removable magazine to the setting device and for undocking the unloaded removable magazine from the setting device, wherein
   the removable magazine comprises a storage plate having a plurality of defined arranged and only one-sided open chambers, the shape of which is adapted to receive a connection element so that at least one connection element is storable therein position-orientedly, and a closure component closing the plurality of defined arranged chambers such that for a loading and an unloading of the plurality of defined arranged chambers only one chamber is opened at a time, wherein the closure component has only one chamber opening, and the only one chamber opening is relatively movable with respect to the plurality of defined arranged chambers, and all chambers except the chamber aligned with the only one chamber opening are closed by the closure component, so that each chamber is specifically approachable, fillable or a joining element stored therein is removable, and wherein the storage plate and the closure component are rotatable and/or pivotable and/or displaceable with respect to each other so that the respective chamber is movable with respect to the chamber opening such that a chamber-specific loading and a chamber-specific unloading of the respective chamber takes place via the only one chamber opening, wherein the removable magazine is rotatable disk-like and/or displaceable and comprises a plurality of chambers so that at least the unloading of the chambers at the setting tool is realizable via a single opening being present for the connection element stored in the chamber being in the unloading position, respectively.

14. A method for loading a setting device by means of a removable magazine according to claim 1, in which a plurality of connection elements is dischargeably storable at a plurality of defined positions, wherein the removable magazine is connectable with a loading station and the setting device for transfer and removal of connection elements, and the method comprises the following steps:
   a. filling a plurality of defined arranged chambers of the removable magazine individually with one and/or a plurality of connection elements at a loading station, wherein the removable magazine comprises a storage plate having the plurality of defined arranged and only one-sided open chambers, the shape of which is adapted to receive the connection element so that at least one connection element is storable therein position-orientedly, a closure component closing the plurality of defined arranged chambers such that for a loading and an unloading of the plurality of defined arranged chambers, only one chamber is opened at a time, wherein the closure component has only one chamber opening, and the only one chamber opening is relatively movable with respect to the plurality of defined arranged chambers, and all chambers except the chamber aligned with the only one chamber opening are closed by the closure component, so that each chamber is specifically approachable, fillable or a joining element stored therein is removable, wherein the storage plate and the closure component are rotatable and/or pivotable and/or movable with respect to each other so that the respective chamber is movable with respect to the chamber opening such that a chamber-specific loading and a chamber-specific unloading of the respective chamber takes place via the only one chamber opening,
   b. sensing a retrievable information which chamber of the removable magazine contains a connection element of which type,
   c. releasing the removable magazine from the loading station,
   d. connecting the removable magazine with the setting device and
   e. transmitting the retrievable information to the setting device so that for the preparation of a joining process a specific joining element is specifically unloadable from one of the defined arranged chambers and is suppliable to the setting device.

15. Method according to claim 14 with the further step during the loading of the removable magazine:
   electronically sensing which connection element is stored in which defined arranged chamber of the removable magazine, and storing the retrievable information.

16. Method according to claim 14, comprising the further step:
   automatically transferring the removable magazine between the setting device and the loading station by means of a manipulator.

17. Method according to claim 14, comprising the further step:
   manually transferring the removable magazine between the setting device and the loading station.

18. A method for operating a setting device with a removable magazine according to claim 1, in which a plurality of connection elements is dischargeably storable at a plurality of defined positions, wherein the removable magazine is connectable with a loading station and the setting device for transfer and removal of connection elements, and the method comprises the following steps:
   a. selecting a connection element which is suitable for a joining task from a plurality of connection elements which are stored in the removable magazine, wherein the removable magazine comprises a storage plate having a plurality of defined arranged and only one-sided open chambers, the shape of which is adapted to receive the connection element so that at least one connection element is storable therein position-orientedly, a closure component closing the plurality of defined arranged chambers such that for a loading and an unloading of the plurality of defined arranged chambers, only one chamber is opened at a time, wherein the closure component has only one chamber opening, and the only one chamber opening is relatively movable with respect to the plurality of defined arranged chambers, and all chambers except the chamber aligned with the only one chamber opening are closed by the closure component, so that each chamber is specifically approachable, fillable or a joining element stored therein is removable, wherein the storage plate and the closure component are rotatable and/or pivotable and/or movable with respect to each other so that the respective chamber is movable with respect to the chamber opening such that a chamber-specific loading and a chamber-specific unloading of the respective chamber takes place via the only one chamber opening,
   b. unloading the selected connection element from the defined arranged chamber of the removable magazine into the setting device based on a recallable information for the selected connection element and
   c. establishing a joining connection with the selected connection element.

19. Method according to claim 18, wherein the joining element is selected from a plurality of different joining elements and is removed from the respective defined arranged chamber of the removable magazine.

* * * * *